Feb. 3, 1931.   W. F. HILLPOT   1,791,313
AUTOMATICALLY OPERATIVE HUMIDIFIER
Filed Aug. 17, 1928
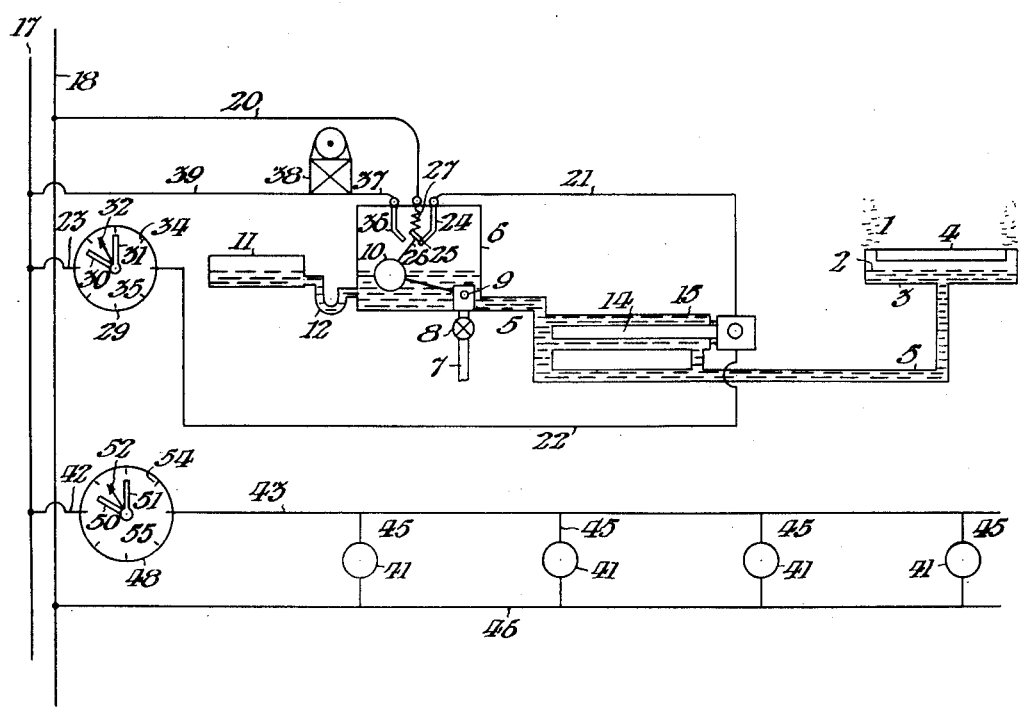
INVENTOR:
WILLIAM FINNEY HILLPOT, Patented Feb. 3, 1931

1,791,313

UNITED STATES PATENT OFFICE

WILLIAM FINNEY HILLPOT, OF FRENCHTOWN, NEW JERSEY

AUTOMATICALLY OPERATIVE HUMIDIFIER

Application filed August 17, 1928. Serial No. 300,343.

My invention is designed for inclusion in an incubator to maintain a predetermined percentage of moisture in the atmosphere of the egg chamber; such as is required for the most efficient incubation. However, my invention may be utilized in any other embodiment, for which it is adapted.

In the form of my invention hereinafter described, water is vaporized from a pan, by the operation of an electrically energized heater submerged in a water container in communication with said pan and supplied from a tank wherein the water is maintained at a predetermined level by a float valve; the level of the water in said tank determining the level of the water in said pan. I find it convenient to also provide an auxiliary pan, in communication with said tank and more readily accessible than the vaporizing pan and in which the level of the water may be more conveniently inspected. The circuit of said electric heater is controlled by a hygrometer which is adjustable to determine that the heater shall be shut off when the humidity reaches a predetermined point, and that said heater shall be turned on when the humidity falls below that predetermined point. Said heating circuit also includes a switch which is normally maintained closed by the float of said float valve in the tank, but which is opened to stop the operation of the heater when said float falls below a predetermined level. That is to say, means are provided to not only stop the heater when the humidity reaches a certain point, but to stop it if and when the water supply falls below a predetermined normal level. Moreover, an adjunctive feature of my invention is the provision of an electric alarm circuit, also controlled by the float of said valve, so that if and when the heating circuit is broken by subsidence of the water below the normal level; the alarm circuit is closed to manifest to the operator that the apparatus is in such abnormal condition.

Of course, an essential factor in determining the degree of humidity of any atmosphere is the temperature of that atmosphere and, in the embodiment of my invention herein set forth; I provide thermostatically controlled electric heaters, in addition to the hygrometically controlled electric heater aforesaid, to determine and regulate the temperature of the atmosphere which is to be humidified.

My invention includes the various novel features of construction and arrangement hereinafter more definitely specified.

In said drawing, I have shown a diagram including, in cooperative connection with electric energy supply conductors, an electric heating circuit including the electric heater which is hygrometically controlled, and an adjunctive electric circuit including the heaters which are thermostatically controlled.

In said drawing; 1 indicates water vapor which is dispensed from the water 2 in the pan 3 which has the plate 4 partly closing the top thereof. The water 2 is supplied to said pan 3 thru the conduits 5, by gravity, from the tank 6 to which the water is supplied from the municipal or other supply pipe 7 under control of the manually operative valve 8 and the automatically operative float valve 9; the level of the water in said tank 6 being predetermined by the set of said float 10; which also determines the level of the water 2 in said pan 3. The level of the water in said vaporizing pan 3 is also manifested by the level of the water in the auxiliary, indicator, pan 11 which is more accessible for inspection than the pan 3 and which is supplied with water thru the trap pipe 12 from the tank 6. The end of said pipe 12 at the tank 6 is located below the level of the water in the latter, to prevent discharge of the hot water vapor from said tank 6 thru said pan 11.

The water 2 is heated to the proper temperature by means of the electric submersion heater 14 which is detachably fitted in the water container 15, which is in communication with said conduits 5.

The electric supply conductors 17 and 18 lead to any suitable source of electric energy, and the circuit for energizing said water heater 14 includes the electric conductors 20, 21, 22, and 23. Said heater circuit is normally closed thru the switch members 24 and 25; the latter being carried by a resilient arm 26 extending from said float 10, and being included in the heating circuit by the flexible connector 27, which permits sliding movement of said switch member 25 upon said switch member 24, during a limited arcuate movement of said float. Said heating circuit includes the hygrometer switch 29, having manually adjustable index arms 30 and 31 upon respectively opposite sides of the automatically movable humidity indicating arm 32 which cooperates with a circular series of graduations 34 on the dial face 35 of said switch 29 to indicate the degree or percentage of humidity. The construction and arrangement of said hygrometically operative switch 29 are such that the index arms 30 and 31 may be so set that the heating circuit is broken when the humidity reaches a certain point and closed when the humidity reaches another predetermined point. Conveniently, said devices may be so set that the circuit of the water heater 14 is broken when the humidity reaches 85% and closed when it falls to 80%.

Said switch member 25 passes off the lower end of the switch member 24 when the water in said tank 6 falls to an abnormal level and thus stops the heater 14 when the water level falls below the bottom of the pan 3. Contemporaneously with the breaking of the heater circuit by movement of said switch member 25, the latter contacts with the switch member 36 in the circuit comprising the conductor 37, the signal 38, and the conductor 39 leading to the supply conductor 17; so as to then energize said alarm by current from said supply conductors 17 and 18. I have exemplified said alarm 38 as a bell. However, any other suitable signal device may be employed.

In order to maintain the proper degree of humidity and temperature for incubation, I associate with the water heater 14 aforesaid, another electric heater or a series of atmospheric heaters 41 which are included in connection with said supply mains 17 and 18, by conductors 42, 43, 45 and 46. The circuit of said atmospheric heaters 41 includes the thermostatically operative switch 48 which is similar to the hygrometically operative switch 29, in that it includes the manually adjustable index arms 50 and 51 upon respectively opposite sides of the automatically movable temperature indicating arm 52 which cooperates with a circular series of graduations 54 on the dial face 55 of said switch 48 to indicate the degree of temperature of the atmosphere which is being humidified.

However, I do not desire to limit myself to the precise details of construction, arrangement or method of operation above described, as it is obvious that various modifications may be made therein without departing from the essential features of my invention, as defined in the appended claims.

I claim:

1. In an atmosphere humidifier; the combination with an open water vaporizer pan; of a water container, in communication with said pan; an electric heater, arranged to heat the water in said container; and a hygrometically operative electric switch adapted to control said heater, in accordance with the humidity of the open atmosphere surrounding said vaporizer pan.

2. Apparatus as in claim 1, including a float valve normally operative to directly control and maintain a supply of water at a predetermined level in said pan; and an electric switch, operatively connected with said float valve, remote from said pan, adapted to break the circuit energizing said heater, when the water in said pan falls below a predetermined level.

3. Apparatus as in claim 1, including a float valve normally operative to maintain a supply of water at a predetermined level in said pan; an electric switch, operatively connected with said float valve, adapted to break the circuit energizing said heater, when the water in said pan falls below a predetermined level; and an electric alarm signal circuit adapted to be closed by movement of a contact on said float valve which breaks said heater circuit.

4. In a humidifier, the combinations with a water vaporizer pan; of a water conduit arranged to supply water to said pan; an electric heater arranged to heat the water in said conduit; and a hygrometically operative electric switch arranged to control the operation of said heater, in accordance with the humidity of the atmosphere surrounding said pan.

5. Apparatus as in claim 4; including an electric heater for said atmosphere and a thermostatically operative electric switch adapted to control said atmospheric heater, in accordance with the temperature of said atmosphere; said switches including manually adjustable means whereby the conditions under which they make and break the respective circuits may be predetermined; whereby said water heater is automatically turned on and off in accordance with the degree of moisture in said atmosphere, and said atmospheric heater is automatically turned on and off in accordance with the degree of temperature of said atmosphere.

6. In an incubator inclosure; the combination with an electric water heater, and means to vaporize water in said inclosure; of a hygrometically operative electric switch, adapted to control said heater circuit and including manually adjustable means whereby the percentages of humidity at which said heater circuit is energized and de-energized may be predetermined; a separate, atmospheric, electric heater in said inclosure; and a thermostatically operative electric switch adapted to control said atmospheric heater and including manually adjustable means whereby the degrees of temperature at which said atmospheric heater circuit is energized and de-energized may be predetermined.

7. Apparatus as in claim 6 including a float valve controlling the supply of water to said water heater; and an electric switch controlled by said float valve and adapted to break the water heater circuit when the water supplied to said heater falls below a predetermined level.

8. The combination with a water supply tank; of a float valve arranged to control the supply of water to said tank; and electric switching means controlled by said float valve, adapted to break one electric circuit and close another electric circuit when the water in said tank falls below a predetermined level, and vice versa.

9. In a humidifier, the combination with a water vaporizer pan; of a water conduit arranged to supply water to said pan; a heater arranged to heat the water in said conduit; and a hygrometically operative electric switch arranged to control the operation of said heater, in accordance with the humidity of the atmosphere surrounding said pan.

10. Apparatus as in claim 9; including a heater for said atmosphere and a thermostatically operative electric switch adapted to control said atmospheric heater, in accordance with the temperature of said atmosphere; said switches including manually adjustable means whereby the conditions under which they make and break the respective circuits may be predetermined; whereby said water heater is automatically turned on and off in accordance with the degree of moisture in said atmosphere, and said atmospheric heater is automatically turned on and off in accordance with the degree of temperature of said atmosphere.

11. In an incubator inclosure; the combination with a water heater, and means to vaporize water in said inclosure; of a hygrometically operative electric switch, adapted to control said heater circuit and including manually adjustable means whereby the percentages of humidity at which said heater circuit is energized and de-energized may be predetermined; a separate, atmospheric, heater in said inclosure; and a thermostatically operative electric switch adapted to control said atmospheric heater and including manually adjustable means whereby the degrees of temperature at which said atmospheric heater circuit is energized and de-energized may be predetermined.

In testimony whereof, I have hereunto signed my name at Philadelphia, Pennsylvania, this nineteenth day of July, 1928.

WILLIAM FINNEY HILLPOT.